United States Patent
Alves

Patent Number: 6,007,135
Date of Patent: Dec. 28, 1999

[54] SUN VISOR MONORAIL SYSTEM WITH LOCKING CARRIAGE ASSEMBLY

[75] Inventor: Joseph E. Alves, Springfield, Oreg.

[73] Assignee: Rosen Product Development, Inc., Eugene, Oreg.

[21] Appl. No.: 08/883,755

[22] Filed: Jun. 27, 1997

[51] Int. Cl.$^6$ ..................................................... B60J 3/00
[52] U.S. Cl. ..................... 296/97.9; 296/97.11; 296/97.4
[58] Field of Search ................... 296/97.4, 97.9, 296/97.11; 248/222.13, 227.4, 228.2, 228.3, 230.2, 230.3

[56] References Cited

U.S. PATENT DOCUMENTS

| | | |
|---|---|---|
| 1,437,656 | 12/1922 | Hein . |
| 1,441,487 | 1/1923 | Doner . |
| 1,442,255 | 1/1923 | Doner . |
| 1,470,553 | 10/1923 | Church ................................... 296/97.9 |
| 1,790,333 | 1/1931 | Tubman . |
| 1,795,184 | 3/1931 | Smith . |
| 1,808,086 | 6/1931 | Ulp ....................................... 296/97.11 |
| 1,814,500 | 7/1931 | Summerbell ......................... 296/97.11 |
| 1,837,546 | 12/1931 | Hartzell ............................... 296/97.11 |
| 1,888,703 | 11/1932 | Summerbell . |
| 1,958,962 | 5/1934 | Crosby . |
| 2,070,434 | 2/1937 | Kangas . |
| 2,322,898 | 6/1943 | Van Dresser . |
| 2,458,677 | 1/1949 | Brundage . |
| 2,726,114 | 12/1955 | Jacobi et al. . |
| 2,829,920 | 4/1958 | Cohen . |
| 2,869,922 | 1/1959 | Chester . |
| 2,932,539 | 4/1960 | Galbraith . |
| 2,978,274 | 4/1961 | Ordman . |
| 3,029,103 | 4/1962 | Horrocks . |
| 3,032,371 | 5/1962 | Berridge et al. . |
| 3,122,393 | 2/1964 | Moody . |
| 4,176,875 | 12/1979 | Dow . |
| 4,428,612 | 1/1984 | Viertel et al. . |
| 4,469,367 | 9/1984 | Kuttler et al. . |
| 4,690,450 | 9/1987 | Boerema et al. ......................... 296/97 |
| 4,703,972 | 11/1987 | Omberg . |
| 4,854,629 | 8/1989 | Hagström . |
| 4,987,315 | 1/1991 | Abu-Shumays et al. .............. 296/97.4 |
| 5,011,212 | 4/1991 | Viertel et al. . |
| 5,039,153 | 8/1991 | Lindberg et al. . |
| 5,056,854 | 10/1991 | Rosen ................................... 296/97.11 |
| 5,158,334 | 10/1992 | Felland . |

(List continued on next page.)

FOREIGN PATENT DOCUMENTS

| | | | |
|---|---|---|---|
| 564431 | 6/1960 | Belgium ............................... 296/97.9 |
| 329055 | 8/1936 | Italy ..................................... 296/97.9 |
| 342357 | 2/1937 | Italy ..................................... 296/97.11 |
| 568001 | 3/1945 | United Kingdom ................... 296/97.9 |
| 935513 | 8/1963 | United Kingdom ................ 296/97.11 |
| 2 108 451 | 10/1981 | United Kingdom ................... 296/97.9 |
| 2108451 | 5/1983 | United Kingdom . |

*Primary Examiner*—Joseph D. Pape
*Assistant Examiner*—Kiran Patel
*Attorney, Agent, or Firm*—Kolisch, Hartwell, Dickinson, McCormack & Heuser

[57] ABSTRACT

A sun visor monorail system, which includes a monorail mounted adjacent a window in a car or airplane cockpit and a sun visor which is selectively positionable along the monorail and selectively stowable away from the window or deployable next to the window, is provided with a gripping system for selectively releasing the sun visor from, and locking the sun visor onto, the monorail. The gripping system includes a first gripping member having a surface for contacting the monorail, a second gripping member having a surface opposed to the first member's surface for contacting the monorail and holding the monorail between the two surfaces, a mounting mechanism supporting the members, and a locking mechanism coupled to the members. The locking mechanism includes a cam mechanism for transforming a rotational force, applied by hand to the locking mechanism, into a gripping force applied to the monorail through the gripping members. The sun visor system is also provided with a rail stop mountable on the monorail, providing detented rotational positions allowing the sun visor to either be flipped up and away from the window or deployed in front of the window.

15 Claims, 8 Drawing Sheets

U.S. PATENT DOCUMENTS

| | | |
|---|---|---|
| 5,190,339 | 3/1993 | Ceideberg . |
| 5,280,988 | 1/1994 | Gute . |
| 5,366,265 | 11/1994 | Aymerich et al. . |
| 5,454,617 | 10/1995 | Welter . |
| 5,484,183 | 1/1996 | Rosa ................................. 296/97.11 |
| 5,529,367 | 6/1996 | Van Order et al. . |
| 5,538,310 | 7/1996 | Frankhouse et al. . |
| 5,556,155 | 9/1996 | Welter . |
| 5,577,792 | 11/1996 | Muyres et al. . |
| 5,600,869 | 2/1997 | Muñoz . |
| 5,765,899 | 6/1998 | Watjer et al. ..................... 296/97.11 |

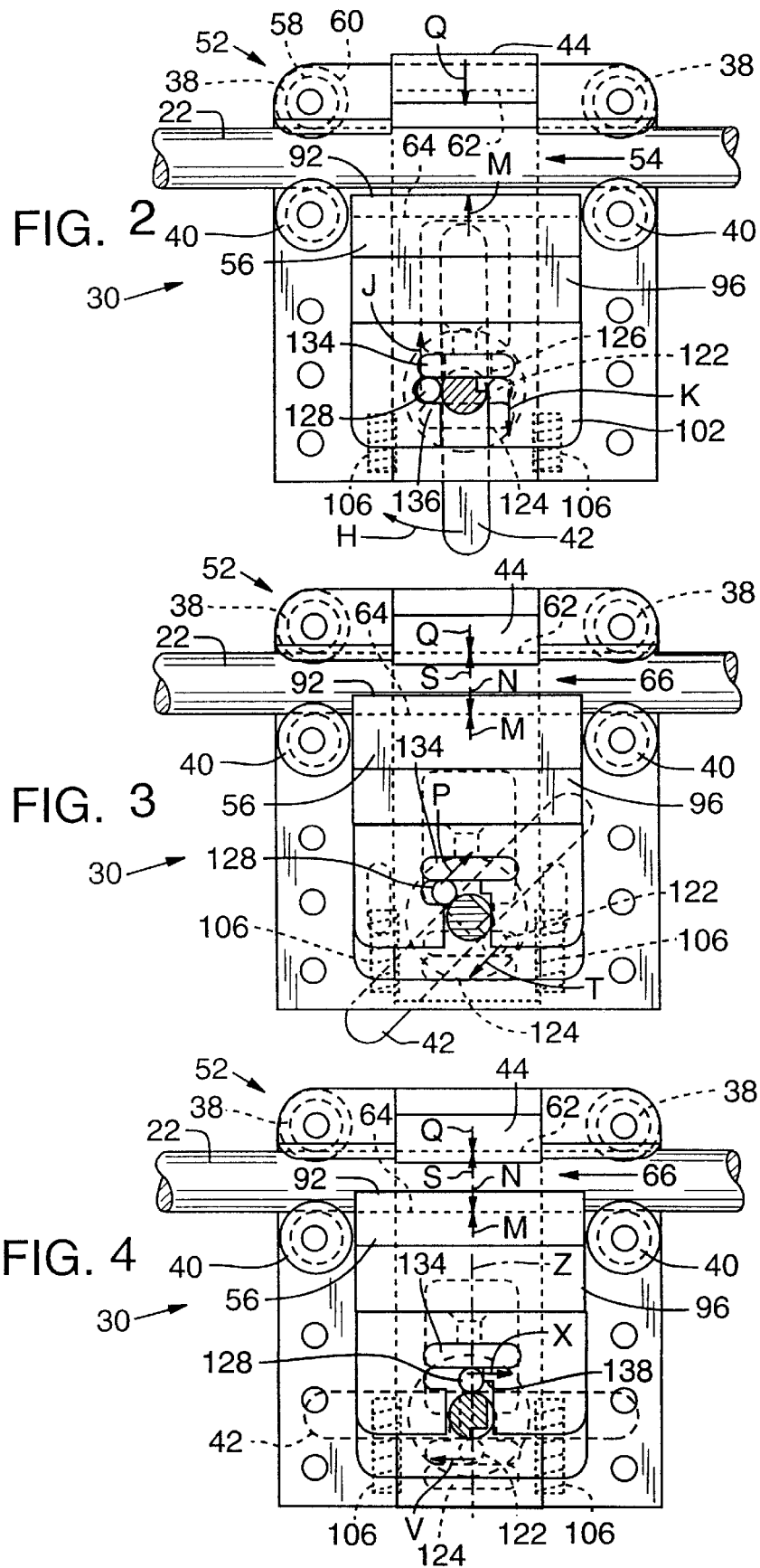

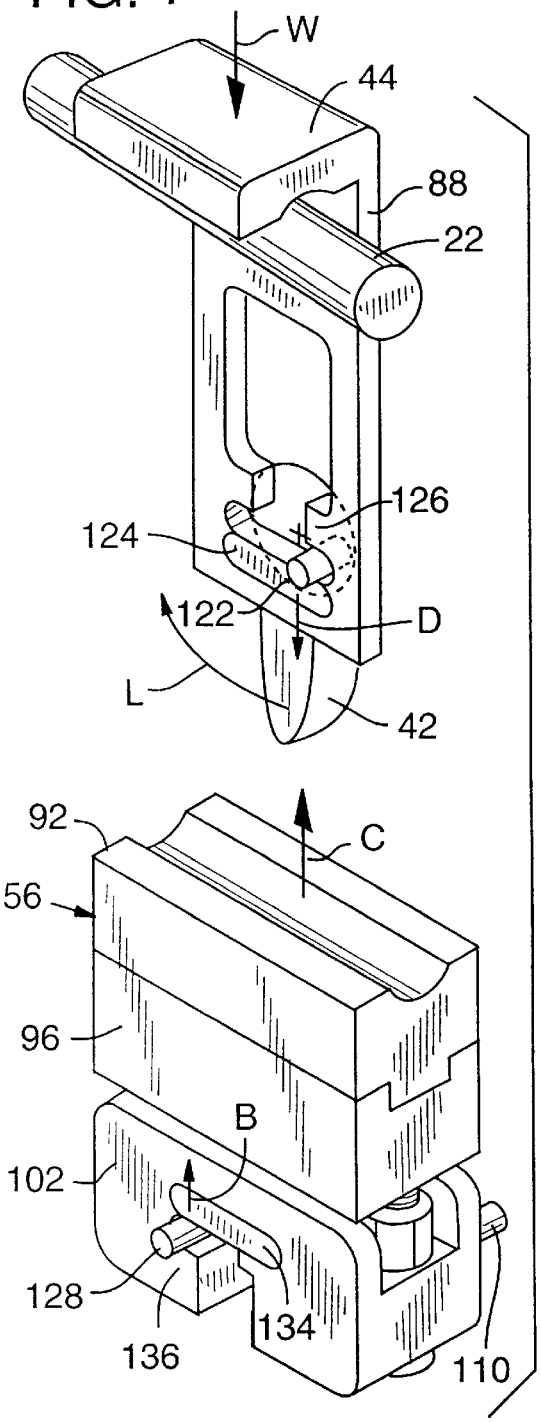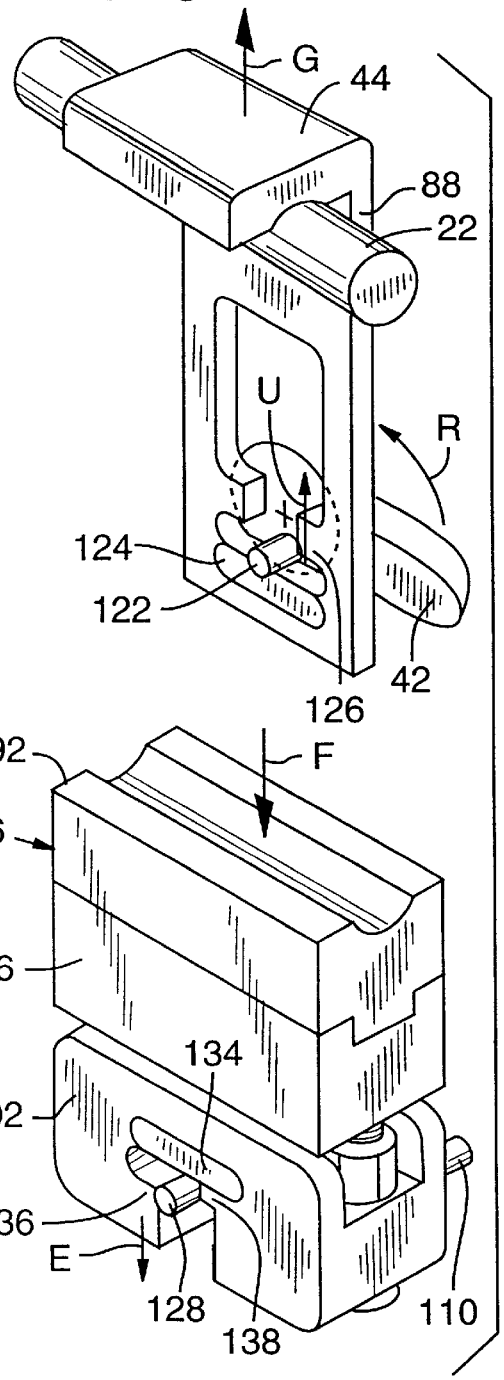

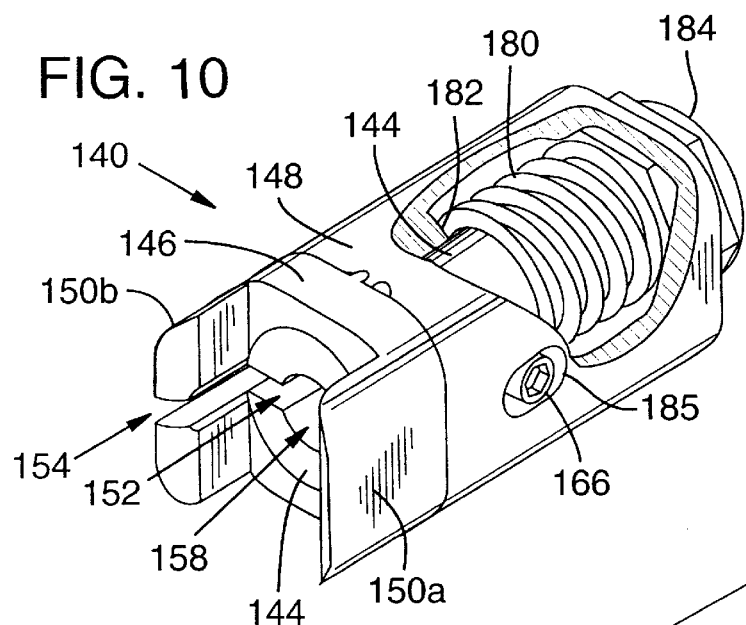
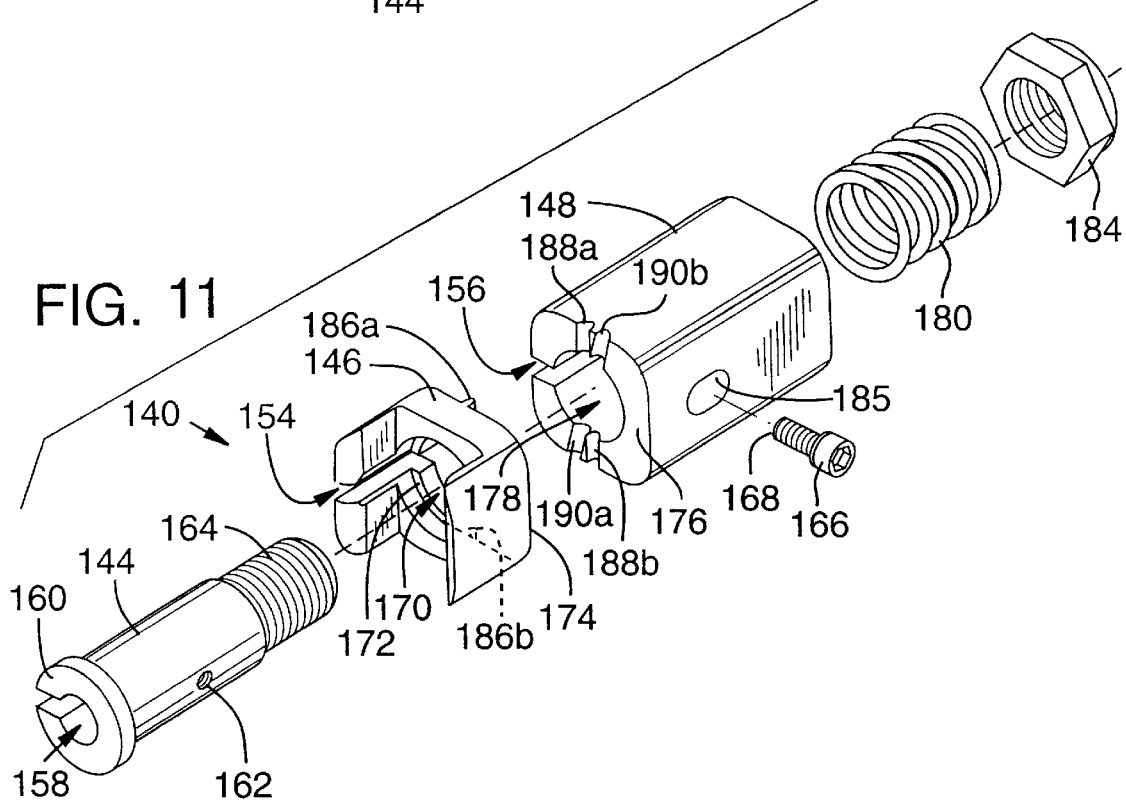

SUN VISOR MONORAIL SYSTEM WITH LOCKING CARRIAGE ASSEMBLY

BACKGROUND AND SUMMARY OF THE INVENTION

The present invention relates generally to sun visors installed in cars or airplane cockpits for filtering or blocking sunlight coming in through the car or cockpit windows. More particularly, it concerns such a sun visor mounted on a monorail with a locking carriage assembly that allows a user to move the sun visor along the monorail, to lock the sun visor in any selected position, and to move the sun visor to an end of the monorail where it may be flipped to a detented, upper position away from the windows.

Applicant is the inventor of the sun visor system described in U.S. Pat. No. 5,056,854, which is a monorail-mounted sun visor system. The monorail is installed in a car or airplane cockpit, preferably just above the windows. The sun visor includes a mounting structure for mounting the sun visor on the monorail. The mounting structure includes jaws contacting the monorail and a panel is connected to the mounting structure. The mounting structure may be selectively locked onto or released from the monorail by operating a knob which turns a screw that tightens or loosens the jaws. This sun visor system provides a convenient, adjustable sunvisor but, it has drawbacks as well. The screw-tightened jaws are prone to loosening inadvertently in the highly vibratory environment of the car or airplane. Although the knob is quite large, giving the user a strong mechanical advantage for tightening the screw, loosening is still a problem and extreme tightening of the screw may make it difficult for the next user of the sun visor to adjust the sun visor position. Furthermore, the mechanical advantage of the knob and screw is only obtained at the cost of requiring the user to turn the knob several times around to adjust between the tightened and loosened positions.

Another drawback is encountered when the visor is flipped up to a fixed, stowed position, as desirable at times in cars and as required in airplane cockpits by the FAA for takeoffs and landings: The sun visor is moved from a deployed position to the stowed position, in a two-handed operation that involves loosening the jaws, flipping the visor up and then tightening the jaws. However, when the visor is flipped up, the knob for tightening the jaws is adjacent the car ceiling or cockpit bulkhead on a side of the jaws facing away from the user, increasing the difficulty of tightening the knob.

What would be preferable is a sun visor mounted on a monorail, providing the maximum flexibility in positioning, that can be locked in place at any selected position on the monorail by a simple, locking handle. The handle would be operable in a simple motion, like a light switch or door knob, but would provide for a positive lock of the sun visor on the monorail. The switch would preferably also provide a total of three positions: (1) a locked position in which the sun visor is substantially fixed in an axial position by a brake along the monorail but, with a leverage advantage obtained by gripping an edge of the visor panel opposite the monorail, the sun visor is also rotatable about the monorail; (2) an intermediate, partially-released position in which the sun visor may be easily moved along or rotated about the monorail while the brake remains in frictional contact with the monorail; and (3) a fully-released position in which the brake is withdrawn from the monorail completely. The monorail is preferably made of a simple, ungated, unitary structure. Another desirable feature in a sun visor would be a structure that provided for flipping the visor up to a detent-fixed, stowed position where the visor may be easily locked in place.

The sun visor of the present invention provides all of these advantages and more. The monorail structure for mounting the sun visor is constructed of an elongate, rigid structure, such as a steel rod having mounting tabs welded thereon for attaching the monorail to the car ceiling or airplane cockpit bulkhead. The monorail is installed around at least the front and sides of the car or cockpit. The sunvisor includes a mounting structure which is coupled to two gripping members with opposed surfaces. The gripping members are mountable on the monorail. A panel frame is coupled to the mounting structure and a visor panel, made of a deeply tinted plastic or glass or an opaque material, is held by the panel frame so that, when the gripping members are mounted on the monorail, the visor panel nominally hangs down adjacent the car or cockpit windows. The visor panel thus advantageously provides a filter or block that can be positioned anywhere sunlight interferes with the driver's or pilot's vision.

The mounting structure includes a mounting mechanism supporting the gripping members and a locking mechanism coupled to the gripping members. Each of the gripping members is supported separately by the mounting mechanism so that each may move independently of the other, although, preferably, the locking mechanism is designed to move the gripping members simultaneously in opposite directions to grip or to release the monorail. The locking mechanism includes a rotatable handle, operable by the user to move the gripping members between the three positions: locked, intermediate, and fully withdrawn. The handle is coupled to a cam mechanism which transforms the rotation of the handle into a translational braking force on the gripping members. The cam mechanism includes front, middle, and rear wheels coaxially coupled by a shaft. The front wheel is welded to the handle. A first dowel pin extends perpendicularly between the front and middle wheels, parallel to, but offset from, the shaft. A second dowel pin extends perpendicularly between the middle and rear wheels, also parallel to, but offset from, the shaft. The dowel pins are positioned and coupled to the gripping members so that, when the handle is turned, one dowel pin moves up and the other dowel pin moves down, causing the gripping members to move in opposite directions.

In the fully withdrawn position, the dowel pins are side by side, on opposite sides of the shaft, lying in a plane roughly parallel to the monorail, and the gripping members are fully retracted from the monorail. As the handle is turned toward the intermediate position, which is approximately 45° from the fully withdrawn position, the dowel pin coupled to the lower gripping member moves up and the dowel pin coupled to the upper gripping member moves down, causing the gripping members to grip the monorail. A spring biases the gripping members to the intermediate position.

Moving the handle to the locked position, which is about 90° from the fully withdrawn position, causes the gripping members to tighten their grip on the monorail. As the grip tightens, the gripping members and monorail press together, producing a force reactive to the braking or gripping force which tends to force the gripping members apart. Prior to the handle reaching the locked position, the reactive force also tends to oppose the rotation of the handle. However, when the handle reaches the locked position, about 90° from the fully withdrawn position, with the dowel pins lying in a plane perpendicular to the monorail, the reactive force is perpendicular to the tangent of the rotational force and so the reactive force no longer has a component opposing the rotational force. As the handle is rotated slightly further, past the 90° position, the reactive force has a component that actually increases the rotational force, ensuring that the handle and gripping members will remain in the locked position.

At one end of the monorail, a rail stop is installed including a fixed member adapted to be rigidly mounted on the monorail and a rotatable member pivotally coupled to the fixed member. The stop includes a detent mechanism interposing the fixed and rotatable members that fixes the rotatable member in place at any of two or more selectable positions relative to the fixed member. The rotatable member also includes a coupling member for engaging the mounting mechanism of the sun visor to control rotation of the sun visor about the monorail.

A significant advantage of the sun visor of the present invention is that the user may quickly and easily rotate the handle just a quarter turn from the fully-released position to the locked position to secure the visor in place. Another advantage is that in the locked position, the gripping members will not release their grip on the monorail despite vibration that would cause a hand-tightened screw to back out.

Another appreciable advantage of the invention is that the user may slide the sun visor into the coupling member of the rail stop and flip the visor panel up to a detented, stowed position and back down to a deployed position. With the sun visor at the rail stop, but down in the deployed position, the user may position the handle to the locked position and then flip the sun visor up to the stowed position. The locked position of the handle prevents axial movement of the sun visor along the monorail, so, the sun visor remains engaged by the coupling member of the rail stop and the rail stop prevents rotational movement of the sun visor about the monorail unless the detent is overcome.

A further advantage of the present invention is that, with the handle in the spring-loaded intermediate position, a user may freely slide the sun visor around the car or cockpit. This position is adequate to hold frictionally the sun visor in place on the rail under most transient conditions. For higher g-forces, the sun visor may be locked in place with just a one-eighth turn of the handle.

These and additional objects and advantages of the present invention will be more readily understood after a consideration of the drawings and the detailed description of the preferred embodiment.

BRIEF DESCRIPTION OF THE DRAWINGS

FIG. 2 is an elevation of the rear side of the carriage of the sun visor system of FIG. 1 with the handle in a vertical, released position and the upper brake and a lower brake withdrawn from the monorail in a fully-withdrawn position.

FIG. 3 is an elevation of the rear side of the carriage of the sun visor system of FIG. 1 with the upper brake and the lower brake contacting the monorail in the intermediate position.

FIG. 4 is an elevation of the rear side of the carriage of the sun visor system of FIG. 1 with the upper brake and the lower brake gripping the monorail in the locked position.

FIG. 7 is a perspective view of the upper and lower brakes separate from the mounting mechanism with a cam mechanism coupled to the brakes in the released position.

FIG. 8 is a perspective view of the upper and lower brakes separate from the mounting mechanism with the cam mechanism and the brakes in the locked position.

FIG. 10 is a perspective view of the sun visor system showing the rail stop's coupling member, rotatable member, fixed member, and detent mechanism interposing the rotatable and fixed members.

FIG. 11 is an exploded perspective view of the sun visor system showing the rail stop with a spring for biasing the detent mechanism, a nut receivable on a threaded end of the fixed member for holding the spring in place, and a screw for clamping the fixed member onto the monorail.

DETAILED DESCRIPTION OF THE PREFERRED EMBODIMENT

Figure 1A:
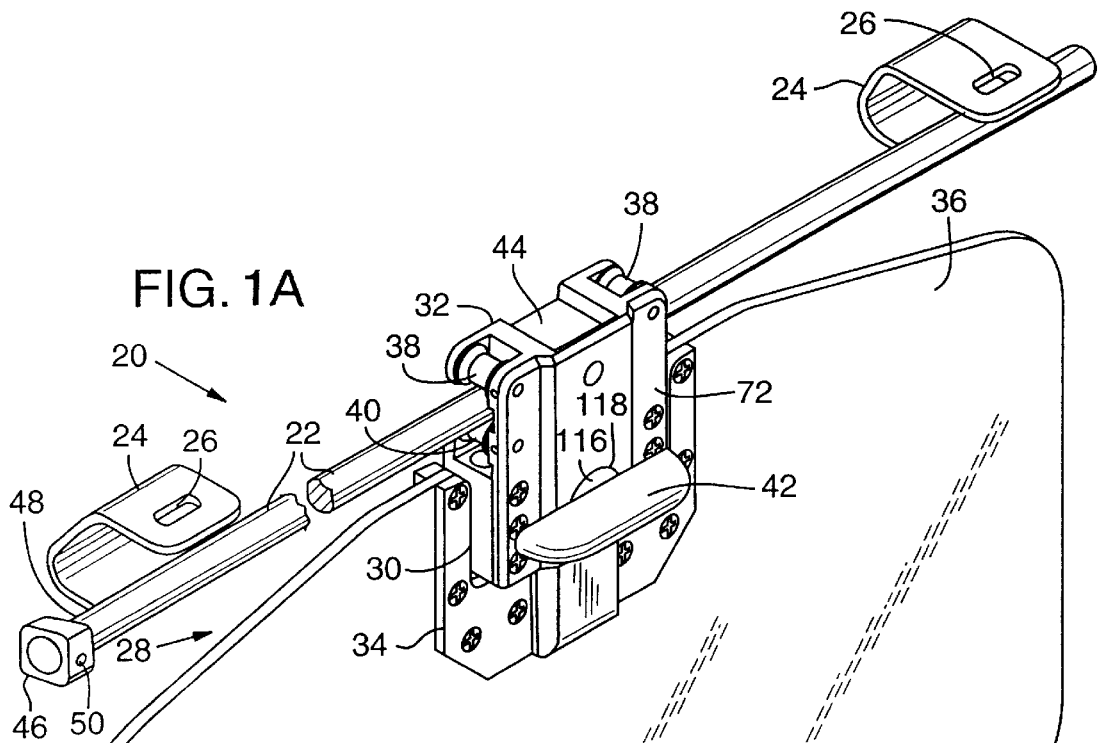
FIG. 1A is a perspective view of the sun visor system of the present invention showing a monorail with a carriage attached thereon, the carriage holding a sun visor panel and having a handle moved to a locked position wherein an upper brake is pressed against the monorail.

As shown in FIG. 1A, a sun visor system of the present invention, generally indicated at 20, includes an elongate rail structure, such as monorail 22 with mounting tabs 24 which are welded in place in monorail 22. Each mounting tab 24 includes a mounting hole 26 for attaching monorail 22 to a wall, ceiling, or bulkhead in a car or airplane cockpit. The monorail is preferably formed of a rigid, metallic material, such as steel. Mounting tabs 24 are preferably made of a readily bendable material such as aluminum to allow easy adaptation of the monorail to fit in a particular car or airplane.

A sun visor, indicated generally at 28, includes a carriage assembly 30 comprising a mounting structure 32 with a panel frame 34 coupled thereon. Mounting structure 32 is mountable and releasably grippable on monorail 22. A visor panel 36 is held by panel frame 34. Visor panel 36 is preferably a deeply tinted, transparent plastic sheet but may alternatively be formed of an opaque material. Mounting structure 32 rides along monorail 22 guided by a pair of upper rollers 38 above the monorail and a pair of lower rollers 40 below the monorail. A handle 42 forms part of a locking mechanism that is operable to lock selectively a brake, which includes an upper brake 44 shown in FIG. 1, onto monorail 22 to prevent axial motion of carriage assembly 30 along the monorail.

Figure 1B:
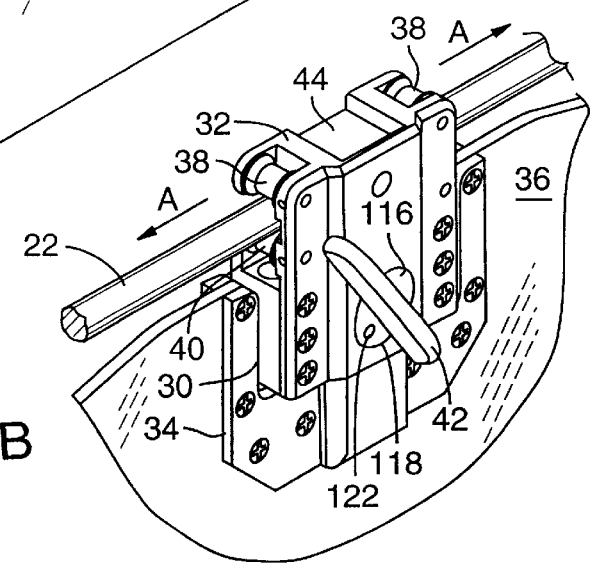
FIG. 1B is a perspective view of the sun visor system of FIG. 1 with the handle moved to an intermediate, partially-released position wherein the upper brake contacts, but does not grip, the monorail.

The sun visor system can be selectively switched between a released condition permitting axial motion of sun visor 28 along monorail 22 and a locked condition with sun visor 28 held in place on monorail 22. Handle 42 is shown in FIG. 1A in a horizontal, locked position which places the system in the locked condition. An intermediate, partially released position for handle 40 is shown in FIG. 1B. As shown by arrows A, with the handle in the intermediate position, carriage assembly 30 may be moved axially along the monorail in either direction. A rail block 46 is shown in FIG. 1A affixed to an end 48 of monorail 22 by a set screw 50. Rail block 46 prevents carriage assembly 30 from sliding off the monorail at end 48. Sun visor 28 may be removed from the monorail by loosening set screw 50, removing rail block 46, and sliding the carriage assembly off the monorail.

A side of carriage assembly 30 opposite handle 42 is shown in FIGS. 2–4. Carriage assembly 30 includes a carriage, indicated generally at 52, which holds carriage assembly 30 on monorail 22. Carriage 52 includes both pairs of upper and lower rollers 38, 40 and a brake, indicated generally at 54, comprising two gripping members, such as upper brake 44 and a lower brake 56. Rollers 38, 40, which together comprise a rolling mechanism adapted to facilitate movement of carriage 52 along monorail 22, each include a cylindrical rolling surface 58 upon which monorail 22 bears and a flange 60 which holds carriage 52 on monorail 22 even when brake 54 is fully released. Upper brake 44 and lower brake 56 have opposed surfaces 62, 64, respectively, which are closeable on monorail 22 to the locked condition, as shown in FIG. 4. Upper brake 44 at surface 62 is preferably composed of a hard, substantially incompressible material, such as steel. Lower brake 56 at surface 64 is preferably composed of a resilient, compressible material, such as rubber. In the intermediate and locked conditions, brakes 44, 56 grip monorail 22 in a nip region, indicated generally at 66, between the opposed surfaces.

Figure 5:
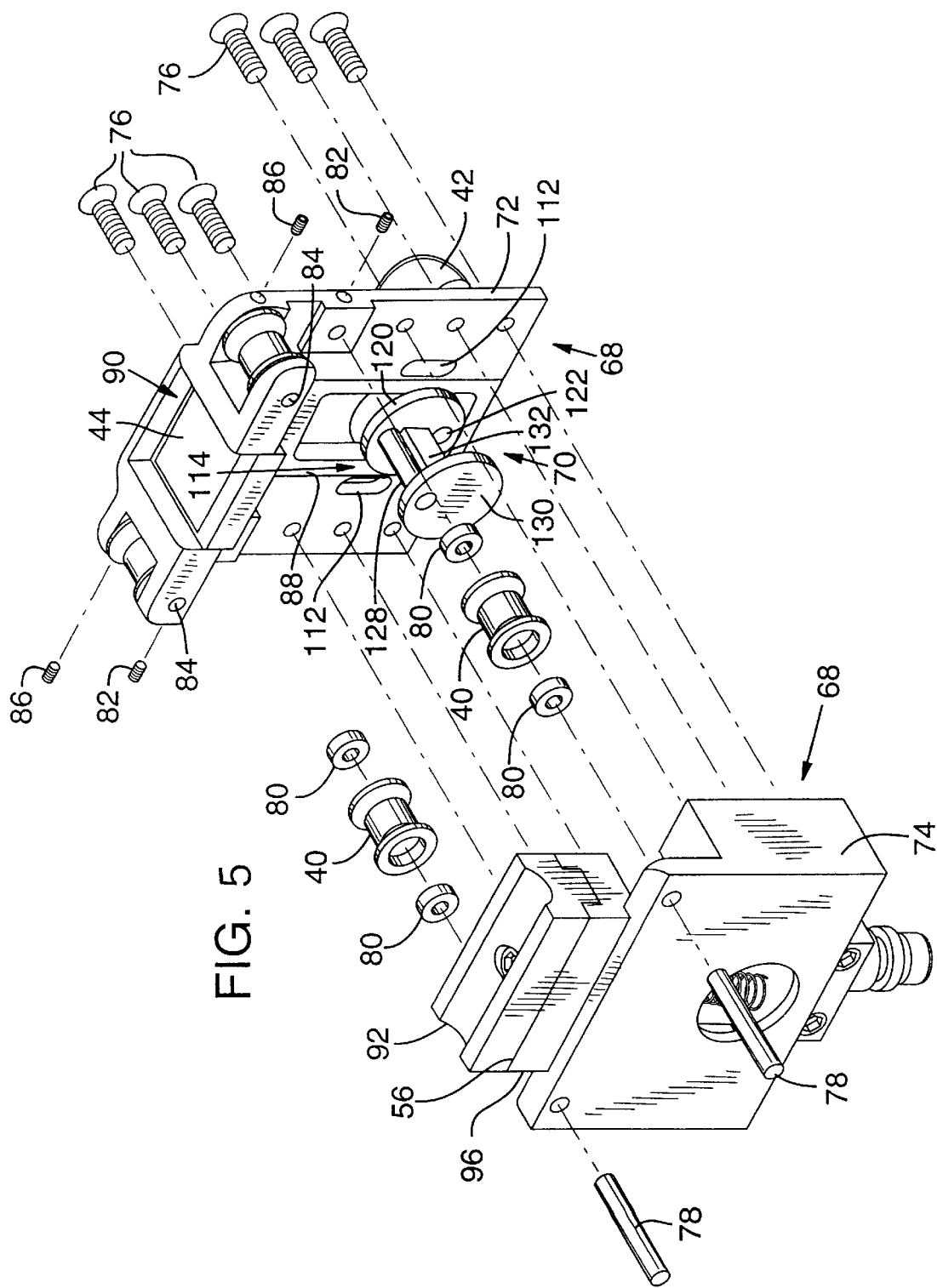
FIG. 5 is an exploded, perspective view of the carriage showing a mounting mechanism for the upper and lower brakes, a locking mechanism for controlling the brakes, and rollers for contacting and gliding along the monorail.

As best seen in FIG. 5, mounting structure 32 includes a mounting mechanism, indicated generally at 68, and a locking mechanism, indicated generally at 70. Mounting mechanism 68 includes a front bracket 72, which supports upper brake 44, and a rear bracket 74, which supports lower brake 56. The front and rear brackets are joined by six screws 76 and two rods 78. Each of rods 78 also supports one of lower rollers 40 with two ball bearing assemblies 80 on each rod. Rods 78 are held in place in front bracket 72 by set screws 82. Upper rollers 38 are mounted in front bracket 72 on ball bearing assemblies (not shown) on rods 84 which are held in place by set screws 86.

Upper brake 44 includes a slider portion 88 (FIGS. 5, 7, & 8) which rides in a channel 90 in front bracket 72. Channel 90 is greased, preferably with a Teflon®-based grease such as Magnalube-G™, prior to installation of upper brake 44 so that upper brake 44 can slide in channel 90 between the released and locked positions. Lower brake 56, best seen in FIG. 6, which includes a resilient, rubber brake pad 92 mounted with an Allen screw 94 on a brake shoe 96, rides in a channel 98 in rear bracket 74. Channel 98 is greased similarly to channel 90 to permit brake 56 to slide in channel 98 between the released and locked positions.

Lower brake 56 is adjustably mounted on two bolts 100 held in a block 102 that also rides in channel 98. Bolts 100 are freely rotatable about a longitudinal axis within block 102 but otherwise do not move relative to block 102. A lock nut 104 is installed on each of bolts 100 to capture bolts 100 in block 102. Lock nuts 104 are tightened just enough to hold bolts 100 in place without up or down travel but still permit rotation of bolts 100. Threaded holes (not shown) in brake shoe 96 receive bolts 100 so that turning bolts 100 causes lower brake 56 to move up or down relative to block 102. The height of lower brake 56 relative to block 102 can be adjusted even when the mounting structure is fully assembled because access holes 108 in rear bracket 74 allow insertion of a tool, such as an Allen wrench, to turn bolts 100. The brake height may be adjusted to accommodate monorails of various widths.

Figure 6:
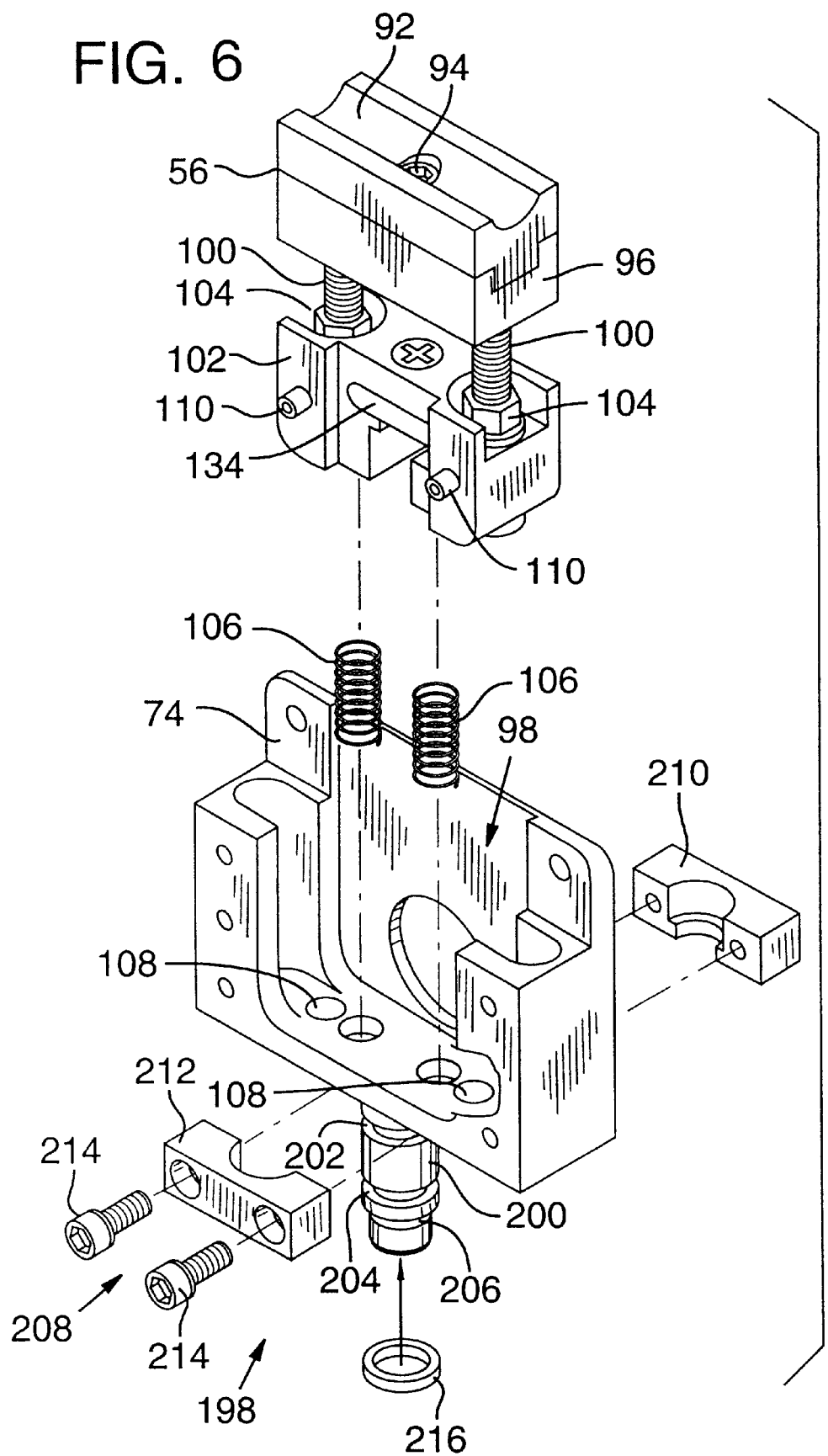
FIG. 6 is an exploded, perspective view of the lower brake showing a pivot mount for the panel frame, the mounting mechanism for the brake, a pair of springs for biasing the brake to the intermediate position, an adjustable support for the brake, and the brake itself.

Block 102 is biased upwardly in channel 98 by a pair of springs 106. As shown in FIG. 6, block 102 also includes a pair of pins 110 which ride in a pair of channels 112 (FIG. 5) in front bracket 72 which guide and limit the motion of block 102 as lower brake 56 is moved between the released and locked positions.

As shown in FIG. 5, locking mechanism 70 includes handle 42 and a dual cam mechanism, indicated generally at 114, coupled to the handle. Cam mechanism 114 includes a front wheel 116 (FIGS. 1 & 2) which is welded to handle 42 and rides in a circular cutout 118 in front bracket 72. Front wheel 116 and cutout 118 allow handle 42 to be rotatable between the released and locked conditions. Front wheel 116 is coupled by a front central shaft (not shown) to a middle wheel 120 (FIG. 5). Front wheel 116 and middle wheel 120 are coaxially coupled at a central point to the front central shaft. A first cam member, such as front dowel pin 122, extends perpendicularly between front wheel 116 and middle wheel 120 at a position offset from the front central shaft. Thus, front dowel pin 122 provides a first cam action when handle 42 is turned, rotating wheels 116, 120, because the dowel pin moves eccentrically with respect to the wheels and, thus, imparts a translational motion to upper brake 44.

The first cam action provided by front dowel pin 122 and the manner in which front dowel pin 122 moves upper brake 44 between the released and locked conditions is best shown in FIGS. 7 & 8. In FIG. 7, upper brake 44 is in the released condition and thus is raised above and away from monorail 22. Handle 42 is in a vertical, fully-released position. Arrow L shows how handle 42 can be rotated toward the locked position. When handle 42 is rotated toward the locked position, front dowel pin 122 moves downwardly, as indicated by arrow D, and also to the left in an arc and presses on an insert 124 in slider portion 88 of upper brake 44 causing the brake to move downwardly onto monorail 22, as indicated by arrow W.

In FIG. 8, upper brake 44 is in the locked condition pressing against monorail 22 and handle 42 is in the horizontal, locked position. Arrow R shows how handle 42 can be moved toward the released position. When handle 42 is moved toward the released position, front dowel pin 122 moves in an arc to the right and upwardly, as shown by arrow U, and presses against catch 126 in slider portion 88 of upper brake 44 causing the brake to move upwardly away from monorail 22, as indicated by arrow G.

FIGS. 7 & 8 also illustrate a second cam action provided for moving lower brake 56 between the released and locked conditions. FIG. 7 shows lower brake 56 in the released position. A second cam member, such as rear dowel pin 128, extends perpendicularly between middle wheel 120 and a rear wheel 130 (FIG. 5). FIG. 5 shows that wheels 120, 130 are coaxially coupled by a rear central shaft 132, which is also coaxial with the front central shaft. Rear dowel pin 128 is offset from the central shafts, as is front dowel pin 122, providing an eccentric motion of rear dowel pin 128 with respect to the central shafts when handle 42 is rotated. Returning to FIG 7, when handle 42 is moved toward the locked condition, rear dowel pin 128 moves in an arc upwardly and to the right and presses upwardly against an insert 134 in block 102, as indicated by arrow B, thus moving lower brake 56 upwardly, as indicated by arrow C. Inserts 124, 134 may be removed from slider portion 88 and block 102, respectively, to accommodate a larger cam mechanism for use with a monorail having a larger diameter.

FIG. 8 shows lower brake 56 in the locked position. When handle 42 is moved toward the released position, rear dowel pin 128 moves in an arc to the left and downwardly pressing against a catch 136 in block 102 and pressing catch 136 downwardly, as indicated by arrow E, causing lower brake 56 to move downwardly, as indicated by arrow F, away from monorail 22. FIG. 8 also shows a stop 138 which prevents rear dowel pin 128 from rotating clockwise past the locked position. Stop 138 is preferably configured so the locked position is exactly at the 12 o'clock position, as shown in FIGS. 4 & 8. Alternatively, stop 138 may be configured to allow rear dowel pin to move slightly past the 12 o'clock position.

FIGS. 2–4 show how the locking mechanism provides for the locked condition that is impervious against inadvertent release even in a vibratory environment where a mere tightened screw would tend to back out of a tightened position. FIG. 2 shows the locking mechanism and brakes in the released condition. Handle 42 is in the vertical, released position with springs 106 compressed by block 102. In moving the handle from the released position toward the locked position, a locking force is applied to handle 42, which is a rotational force applied in a clockwise direction, as indicated by arrow H. At rear dowel pin 128, the rotational force is transformed into a translational force along a tangent to the rotational force, as indicated by arrow J, that pushes lower brake 56 upward toward monorail 22, as indicated by arrow M. Simultaneously, at front dowel pin 122, the rotational force is transformed into a translational force along a tangent to the rotational force, as indicated by arrow K, that pulls upper brake 44 downward toward monorail 22, as indicated by arrow Q.

FIG. 3 shows the locking mechanism and the brakes in the intermediate, partially released condition. Rear dowel pin 128 pushes against lower brake insert 134, applying a translational, braking or gripping force to lower brake 56, as indicated by arrow M, bringing lower brake 56 into contact with monorail 22 at surface 64. A force reactive to the braking force, produced by compression of lower brake 56 against monorail 22 is indicated by arrow N. Reactive force N has a component which opposes the rotational force because, at rear dowel pin 128, a tangent to the rotational force, as indicated by arrow P, is offset by about 45° from reactive force N. Likewise, front dowel pin 122 pushes against upper brake insert 124, applying a translational, braking or gripping force, indicated by arrow Q, to upper brake 44 producing a reactive force, indicated by arrow S, as upper brake 56 presses against monorail 22 at surface 62. Reactive force S has a component which opposes the rotational force applied to the handle because, at front dowel pin 122, a tangent to the rotational force, as indicated by arrow T, is offset by about 45° from reactive force S.

FIG. 4 shows the locking mechanism and the brakes in the locked condition wherein a tangent to the rotational force at rear dowel pin 128, indicated by arrow X, is offset by about 90° from, i.e., is substantially perpendicular to, reactive force N. At front dowel pin 122, a tangent to the rotational force, indicated by arrow V, is offset by about 90° from reactive force S. Therefore, neither reactive force N nor reactive force S oppose the rotational force. At most, reactive forces N & S will have only a negligible component in opposition to the rotational force. As a result, the reactive forces, N & S, which are applied within nip region 66 in directions to force upper brake 44 and lower brake 56 apart, are ineffective to force the brakes apart. FIG. 4 also shows that, in the locked position, a plane, indicated by dashed line Z, bisecting both front and rear dowel pins 122, 128, substantially includes the braking forces M, Q and reactive forces N, S.

If the alternative design for stop 138 is used wherein stop 138 allows rear dowel pin 128 to rotate beyond the 12 o'clock, or 90° offset position, reactive forces N & S actually increase the rotational force, further locking the brakes in place. However, handle 42 can always be rotated back toward the released position to open selectively the brakes to the released condition.

FIGS. 2–4 also illustrate that upper brake 44 and lower brake 56 are movable from the released position toward the locked position either by operation of the locking mechanism using handle 42, as described just above, or by a force applied directly to the brakes to move the members together, but, the brakes are movable from the locked position to the released position only by operation of the locking mechanism, preferably by rotating handle 42. As shown in FIG. 2, forces applied directly to upper brake 44, in the direction indicated by arrow Q, and to lower brake 56, in the direction indicated by arrow M, will be effective to force the brakes together against monorail 22 because catch 126 will press against front dowel pin 122 and catch 136 will press against rear dowel pin 128, causing handle 42 to rotate in the locking direction, indicated by arrow H. However, as described above, once the brakes are in the locked condition, the reactive forces N & S to the braking forces M & Q are ineffective to force the brakes apart. Thus, the locking mechanism is operable in a simple motion, i.e., rotating a handle just a quarter turn, and the simple motion provides a positive lock of the sun visor on the monorail. The locked position prevents axial motion of the sun visor along the monorail, but, the brakes still permit the sun visor to be rotated about the monorail because the visor panel provides for a leverage advantage that overcomes the gripping force for rotation about the monorail.

Preferably, in switching from the released condition to the locked condition, both of the gripping members are moved by the locking mechanism toward the monorail, and, the locking mechanism withdraws both gripping members from the monorail in switching from the locked to the released condition. However, alternatively, the locking mechanism may be designed with the gripping members closeable on the monorail with one of the gripping members held stationary relative to the mounting structure and the other gripping member, only, moved by the locking mechanism. For example, upper brake 44 may be in a fixed position relative to mounting structure 32 rather than being slidable in channel 90, and, only lower brake 56 may be movable by the locking mechanism. In such case, the portion of the locking mechanism responsible for moving upper brake 56 in the preferred embodiment, i.e., dowel pin 122, slider 88, insert 124, may be eliminated.

Figure 9:
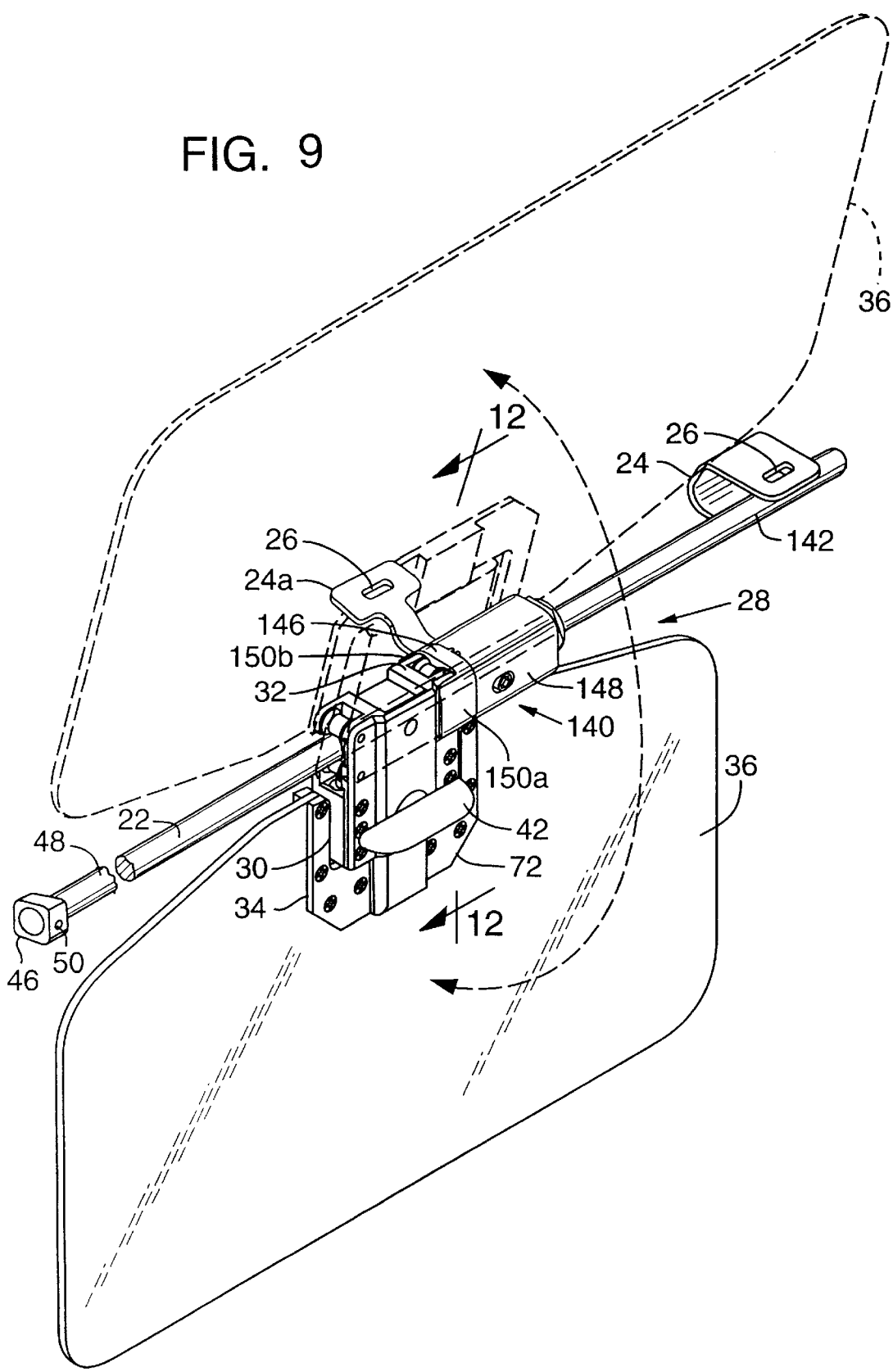
FIG. 9 is a perspective view of the sun visor system of FIG. 1 showing the carriage engaged by a rail stop in a deployed position and showing a stowed position in phantom line.

Because controlling the rotation of the sun visor about the monorail is required during operation of the sun visor system, a rail stop, indicated generally at 140 in FIG. 9, is provided adjacent an end 142 of monorail 22 opposite end 48. A mounting tab 24a, welded to monorail 22, is configured to be mountable to the car ceiling or cockpit bulkhead, using mounting hole 26. Tab 24a is bent to extend away from monorail 22 to allow monorail 22 to be mounted clear of the ceiling or bulkhead to prevent interference between the rotating sun visor and the ceiling or bulkhead. Rail stop 140 includes a fixed member, such as partially threaded sleeve 144 (best seen in FIG. 11), rigidly mounted on monorail 22, a rotatable member 146 pivotally coupled to rotate about sleeve 144, and a detent mechanism 148 interposing sleeve 144 and rotatable member 146. Rotatable member 146 includes a coupling member, such as dual wings 150a, 150b, which, when sun visor 28 is moved into rail stop 140, engage mounting structure 32 to control the rotation of the sun visor about the monorail.

Rail stop 140 is shown in more detail in FIGS. 10 & 11. Sleeve 144, rotatable member 146, and detent mechanism 148 each include a slot 152, 154 & 156 respectively, along the rear side configured to receive mounting tab 24a when the rail stop is mounted on the monorail. Sleeve 144 has a central channel 158 configured to receive monorail 22. Sleeve 144 also includes a head 160 at one end, an internally threaded, radial aperture 162, and an externally threaded end 164 opposite the head. Sleeve 144 is held in place on the monorail by a set screw 166 receivable in aperture 162. When set screw 166 is screwed into aperture 162, an end 168 impinges on the monorail as screw 166 is tightened to fix sleeve 144 in place on the monorail.

Rotatable member 146 includes a central channel 170 surrounded by a first shoulder 172. Rotatable member 146 is greased internally in central channel 170 and installed over sleeve 144 with first shoulder 172 bearing on head 160. Rotatable member 146 is free to rotate about sleeve 144 but head 160 holds rotatable member 146 in place axially on one side at first shoulder 172. On a side of rotatable member 146 opposite first shoulder 172, a second shoulder 174 abuts a face 176 of detent mechanism 148, which surrounds a central channel 178 of the detent mechanism. Central channel 178 is greased prior to assembly and is configured to receive and bear axially on sleeve 144. Face 176 is kept in tension against second shoulder 174 by a spring 180 which is captured between an internal shoulder 182 of detent mechanism 148 and a nut 184 which is installed on threaded end 164 of sleeve 144. Although spring 180 biases detent mechanism 148 against rotatable member 146, detent mechanism 148 is movable axially along sleeve 144 away from rotatable member 146 when the bias of spring 180 is overcome. Axial movement of detent mechanism 148 is limited, however, because set screw 168 is disposed within a limiting slot 185 in detent mechanism 148.

Figure 12:
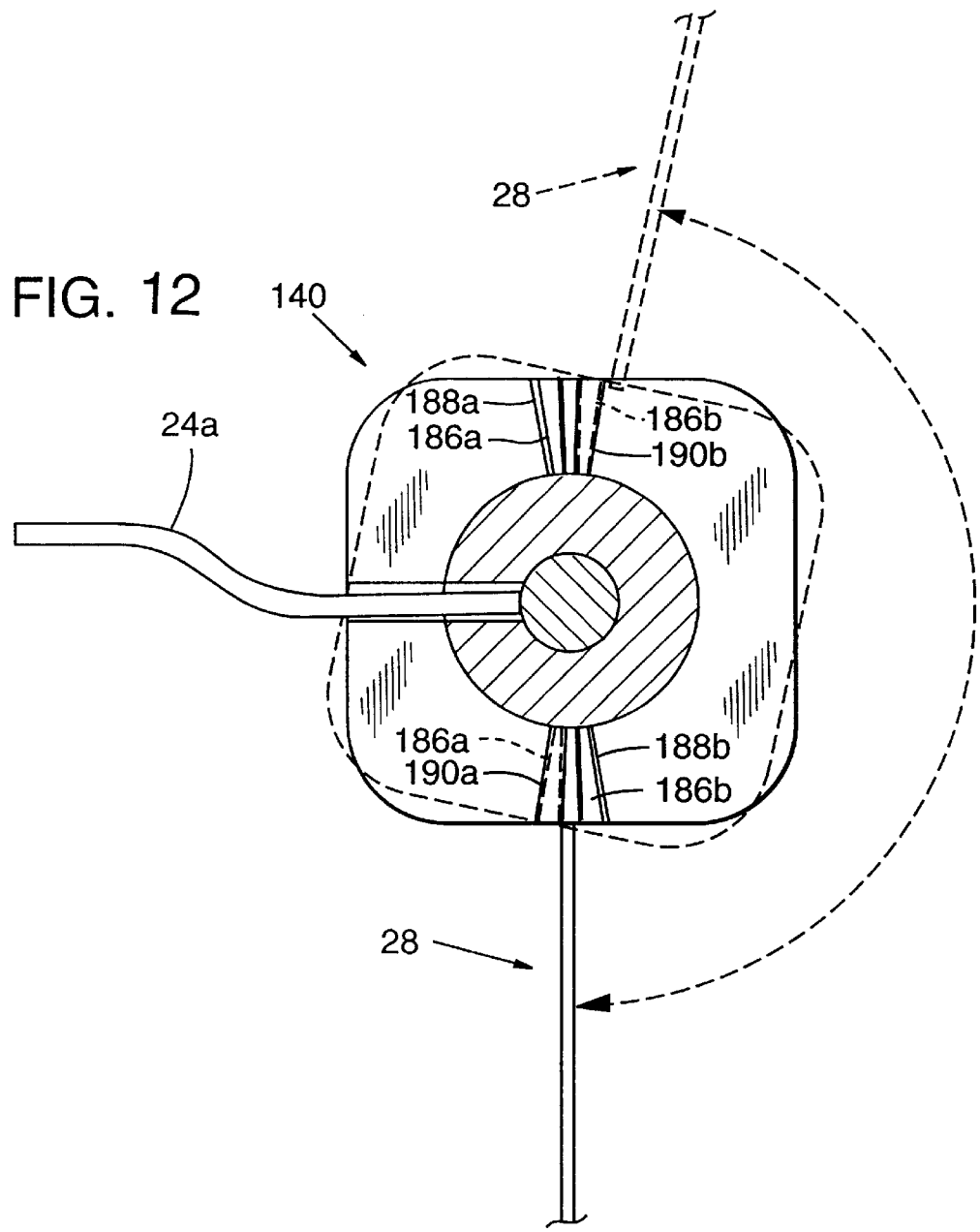
FIG. 12 is an enlarged cross-sectional view of the sun visor system showing the rotational movement of the visor panel and the rotatable member about the monorail between the deployed position and the stowed position, shown in phantom line.

Second shoulder 174 of rotatable member 144 includes two tabs 186a, 186b located on opposite sides of second shoulder 174. Face 176 of detent mechanism 148 has two pairs of corresponding notches 188a, b & 190a, b which provide two detented positions for rotatable member 146. A first detented position with sun visor 28 engaging rail stop 140 in a deployed position is shown in solid line in FIG. 12. In the deployed position, tabs 186a & 186b are in notches 188a & 188b, respectively. From the deployed position, sun visor 28 may be rotated to a second detented, stowed position, shown in dashed lines, that is preferably about 170° away, with tabs 186a & 186b in notches 190a & 190b, respectively.

Figure 13:
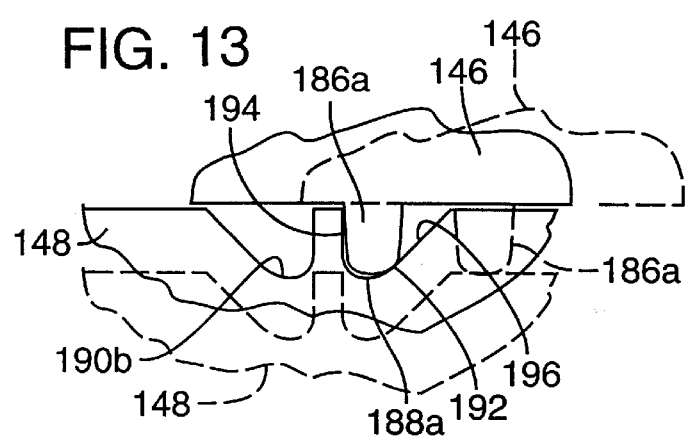
FIG. 13 is an enlarged view of the sun visor system showing the rotatable member and the detent mechanism and illustrating a tab on the rotatable member which slides into and out of a notch on the detent mechanism along a beveled side of the notch.

FIG. 13 shows how rotatable member 146 may be moved between, but not beyond, the deployed and stowed positions. Each tab, such as tab 186a, has a generally semicircular end 192 which rests in the notch, such as notch 188a, when the rail stop is in one of the detented positions. Each notch has a steeply walled side 194 and a beveled side 196. When rotatable member 146 is moved so that tab 186a moves toward beveled side 196, detent mechanism 148 is pushed away from rotatable member 146 as tab end 192 bears on beveled side 196 which acts as an inclined plane giving a mechanical advantage to overcome the bias of spring 180. However, when tab 186a is moved toward steeply walled side 194, tab 186a butts against the steeply walled side without any mechanical advantage for overcoming the bias of spring 180. Thus, the rail stop provides for detents for the stowed and deployed positions without allowing the sun visor to be rotated beyond those positions.

FIG. 6 shows a pivot mount, indicated generally at 198, extending from rear bracket 74 of mounting structure 32, for pivotally mounting panel frame 34 (FIG. 1A) to the mounting structure. Pivot mount 198 includes rod 200, rigidly coupled to bracket 74, having upper, middle, and lower mounting grooves 202, 204, 206 formed circumferentially around rod 200. A brace, indicated generally at 208, formed of two halves 210, 212 joined by two Allen screws 214, is pivotally mounted on rod 200 with an inner ridge pivotally riding in upper groove 202. An O-ring 216 is mounted in middle groove 204. A cotter pin (not shown) is mounted in lower groove 206. Panel frame 34 includes complementary mounting structure (not shown) to receive pivot mount 198 including rod 200, brace 208, and the cotter pin, and be mounted thereon.

While the present invention has been shown and described with reference to the foregoing preferred and alternate embodiments, it is to be understood by those skilled in the art that other changes in form and detail may be made therein without departing from the spirit and scope of the invention as defined in the appended claims.

I claim:

1. A system for releasably gripping a visor panel on an elongate rail structure and selectively switching between a released condition permitting axial motion of the visor along the rail structure and a locked condition for holding the visor in place on the rail structure, the system comprising:

first and second gripping members having opposed surfaces which are closeable on the rail structure to the locked condition, the members in the locked condition gripping the rail structure in a nip region between the surfaces;

a mounting structure adapted to support the members and to close selectively the members to the locked condition, wherein a force applied within the nip region in a direction to force the members apart is ineffective to force the members apart, the mounting structure further being adapted to open selectively the members to the released condition; and a panel frame coupled to the mounting structure and adapted to secure the visor panel.

2. The system of claim 1 wherein the first gripping member is composed of a resilient material and the second gripping member is composed of a hard material.

3. The system of claim 1 further comprising a rail stop mountable on the rail structure, the rail stop including a fixed member adapted to be rigidly mounted on the rail structure, a rotatable member pivotally coupled to the fixed member, and a detent mechanism interposing the fixed member and the rotatable member for selectively securing the rotatable member at a plurality of detented positions, the rotatable member including a coupling member for engaging the mounting structure to control the rotation of the mounting structure about the rail structure.

4. A carriage assembly for use in a sun visor system including a monorail and a visor panel, the assembly comprising:

a panel frame adapted to receive and secure the visor panel;

a monorail carriage coupled to the panel frame, the carriage being adapted to receive and ride along the monorail, the carriage including a brake; and a locking mechanism coupled to the brake, the locking mechanism being adapted to allow a user to apply a locking force to the locking mechanism, the locking force being translated by the locking mechanism into a braking force causing the brake to grip the monorail, the locking mechanism having a locked position wherein a force reactive to the braking force does not substantially oppose the locking force.

5. The assembly of claim 4 wherein the locking force is a rotational force having a tangent in the locked position and the locking mechanism includes a cam mechanism for transforming the rotational force to the braking force, the force reactive to the braking force in the locked position being substantially perpendicular to the tangent of the rotational force.

6. The assembly of claim 4 wherein the locking force is a rotational force and the locking mechanism includes a cam mechanism for transforming the rotational force to the braking force, the force reactive to the braking force in the locked position having a component that increases the locking force.

7. The assembly of claim 4 wherein the brake further comprises first and second gripping members having opposed surfaces which are closeable on the monorail to the locked condition, the members in the locked condition gripping the monorail between the surfaces.

8. The assembly of claim 7 wherein the first gripping member is composed of a resilient material and the second gripping member is composed of a hard material.

9. The assembly of claim 7 wherein the locking force is a rotational force and the locking mechanism includes a cam mechanism having a first cam member coupled to the first gripping member and a second cam member coupled to the second gripping member, wherein the rotational force causes the cam members to move the gripping members together.

10. The assembly of claim 9 wherein the braking force is substantially included in a plane bisecting the cam members in the locked position.

11. The assembly of claim 4 further comprising a rail stop mountable on the monorail, the rail stop including a fixed member adapted to be rigidly mounted on the monorail, a rotatable member pivotally coupled to the fixed member, and a detent mechanism interposing the fixed member and the rotatable member for selectively securing the rotatable member at a plurality of detented positions, the rotatable member including a coupling member for engaging the carriage to control rotation of the carriage about the monorail.

12. The assembly of claim 4 wherein the carriage further comprises a rolling mechanism adapted to facilitate movement of the carriage on the monorail.

13. The assembly of claim 12 wherein the locking mechanism has a released position wherein the brake is substantially removed from the monorail.

14. The assembly of claim 4 wherein the locking mechanism has an intermediate position wherein the braking force is applied to the brake to place the brake in contact with the monorail structure and the force reactive to the braking force opposes the locking force.

15. A sun visor system for use in a transportation vehicle, the system comprising:

an elongate rail structure mountable in the vehicle;

a carriage assembly mountable on the rail structure, the assembly including a mounting structure adapted to maintain the assembly on the rail structure, the assembly further including a brake and a locking mechanism coupled to the brake, the locking mechanism configured to control the brake to permit selective switching between a released condition permitting axial motion of the assembly along the rail structure and a locked condition for holding the assembly in place on the rail structure, wherein the locking mechanism includes a cam mechanism for transforming a rotational locking force applied to the locking mechanism into a braking force that grips the brake on the rail structure; and a visor panel coupled to the mounting structure.

\* \* \* \* \*